United States Patent
Reohr et al.

(10) Patent No.: US 7,093,075 B2
(45) Date of Patent: Aug. 15, 2006

(54) LOCATION-BASED PLACEMENT ALGORITHMS FOR SET ASSOCIATIVE CACHE MEMORY

(75) Inventors: William Robert Reohr, Ridgefield, CT (US); Zhigang Hu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 10/704,452

(22) Filed: Nov. 7, 2003

(65) Prior Publication Data

US 2005/0102475 A1     May 12, 2005

(51) Int. Cl.
*G06F 12/00*        (2006.01)
(52) U.S. Cl. .................. 711/128; 711/129; 711/136
(58) Field of Classification Search ................ 711/118, 711/128, 204, 220, 129
See application file for complete search history.

(56) References Cited

U.S. PATENT DOCUMENTS

| | | | | |
|---|---|---|---|---|
| 4,807,110 | A | * | 2/1989 | Pomerene et al. .......... 711/213 |
| 5,369,753 | A | * | 11/1994 | Tipley ........................ 711/122 |
| 5,835,951 | A | * | 11/1998 | McMahan ................... 711/145 |
| 6,105,111 | A | * | 8/2000 | Hammarlund et al. ...... 711/136 |
| 6,138,225 | A | * | 10/2000 | Upton et al. ................ 711/207 |
| 6,247,094 | B1 | * | 6/2001 | Kumar et al. .................. 711/3 |
| 6,370,622 | B1 | * | 4/2002 | Chiou et al. ................ 711/146 |
| 6,389,505 | B1 | | 5/2002 | Emma et al. |
| 6,418,525 | B1 | * | 7/2002 | Charney et al. ............ 711/213 |
| 2003/0093644 | A1 | * | 5/2003 | Fanning ...................... 711/210 |
| 2003/0217236 | A1 | * | 11/2003 | Rowlands .................... 711/145 |

OTHER PUBLICATIONS

R. Balasubramonian, D.H. Albonesi, A. Buyuktosunoglu, S. Dwarkadas; Memory Hierarchy Reconfiguration for Energy and Performance in General-Purpose Processor Architectures; 33rd International Symposium on Microarchitecture , pp. 245-257, Dec. 2000.

S. Dropsho, A. Buyuktosunoglu, R. Balasubramonian, D.H. Albonesi, S. Dwarkadas, G. Semeraro, G. Magklis, M.L. Scott; Integrating Adaptive On-Chip Storage Structures for Reduced Dynamic Power; 1th International Conference on Parallel Architectures and Compilation Techniques, pp. 141-152, Sep. 2002.

Zhigang Hu, Stefanos Kaxiras, Margaret Martonosi; Improving Cache Power Efficiency with an Asymmetric Set-Associative, Workshop on Memory Performance Issues (WMPI 2001, in conjunction with ISCA-28), Jun. 2001.

Zhigang Hu, Stefanos Kaxiras, Margaret Martonosi; Let Caches Decay: Reducing Leakage Energy via Exploitation of Cache Generational Behavior, ACM Transaction on Computer Systems (ACM TOCS). May 2002.

\* cited by examiner

*Primary Examiner*—Reginald G. Bragdon
*Assistant Examiner*—Thanh D. Vo
(74) *Attorney, Agent, or Firm*—Keusey, Tutunjian & Bitetto, P.C.

(57) ABSTRACT

A system and method for reducing latency in memory systems is provided. A copy way is established in a set of a set associative cache, which is physically closer to a requesting entity than other memory positions. Likely to be accessed data is copied to the copy way for subsequent access. In this way, subsequent accesses of the most likely data have their access time reduced due to the physical proximity of the data being close to the requesting entity. Methods herein further provide ranking and rearranging blocks in the cache based on coupled local and global least recently used (LRU) algorithms to reduce latency time.

21 Claims, 11 Drawing Sheets

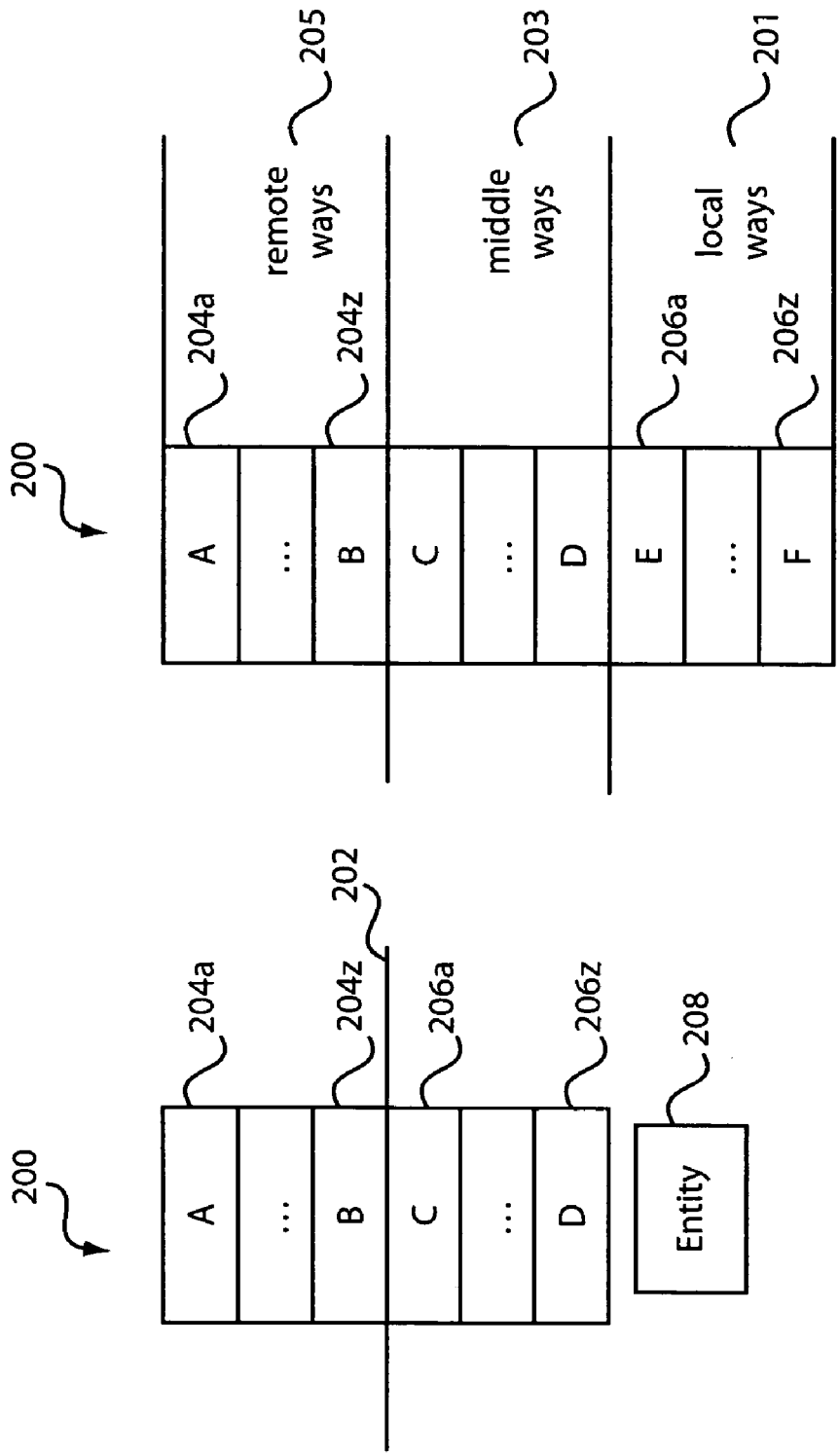

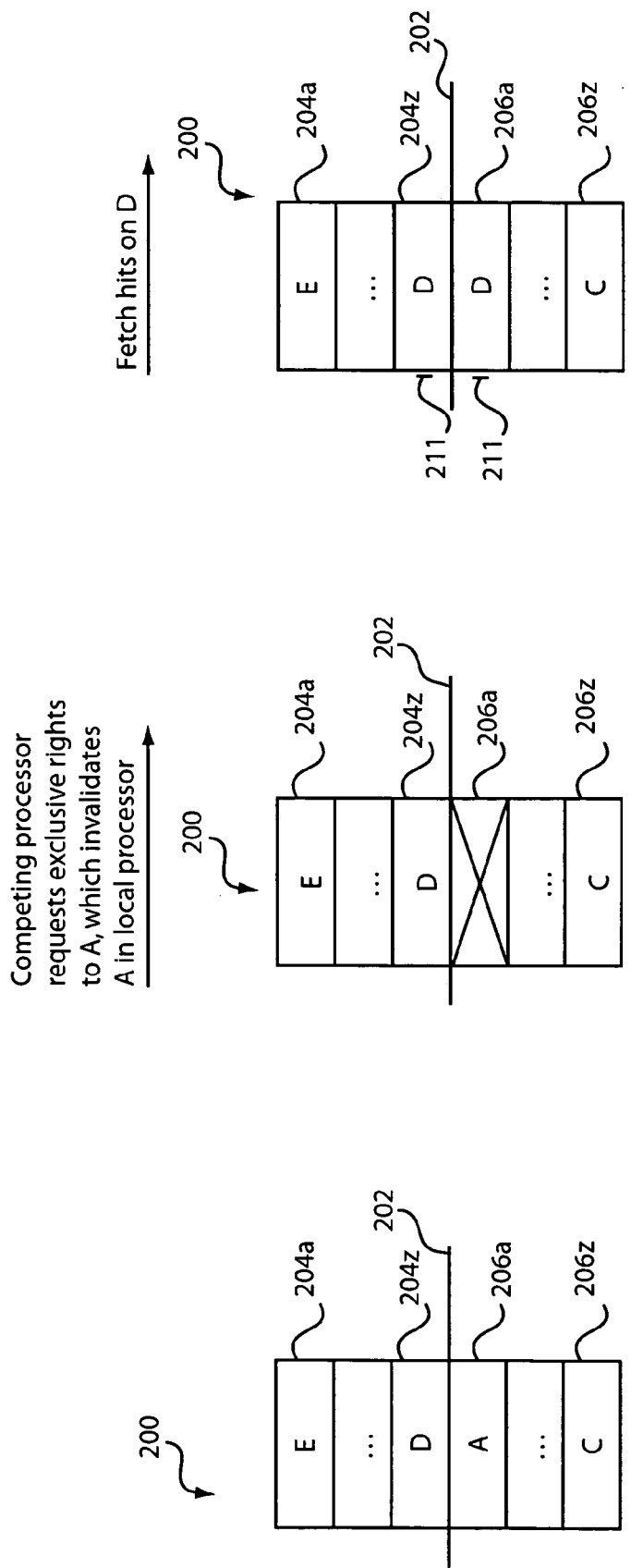

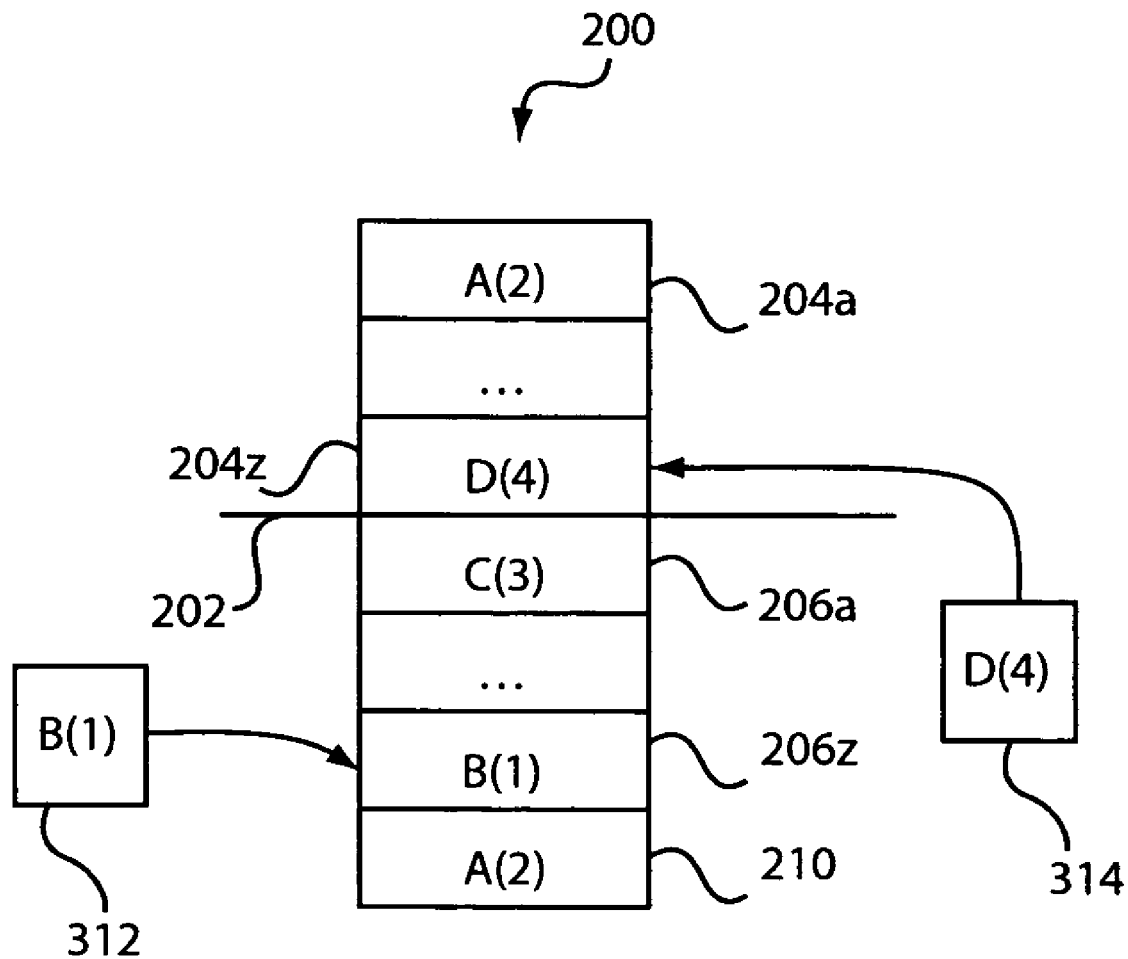
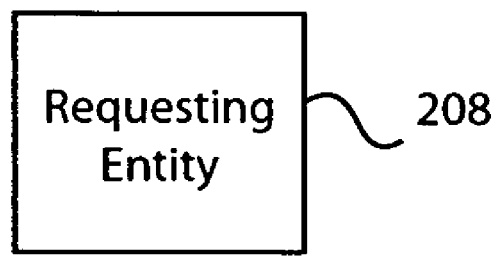
FIG. 8E

LOCATION-BASED PLACEMENT ALGORITHMS FOR SET ASSOCIATIVE CACHE MEMORY

BACKGROUND OF THE INVENTION

1. Field of the Invention

The present invention relates to memory allocation, and more particularly to a system and method for placement of stored memory elements to reduce latency in computer systems.

2. Description of the Related Art

Advances in computer technology often result in increased sensitivity to particular performance characteristics. For example, with each generation in processor technology, the transit time of a signal in flight on a wire (e.g. an RC time constant) increases with respect to the switching time of a transistor. Considering that a wire serves as a communication pathway and transistors form logic gates, reductions in communication latency may have more of an impact on processor performance than those directed toward increasing pure computational capacity.

As such line or wire latency plays a major role in the speed and responsiveness of not only processors but also any circuit including high-speed memory systems.

Therefore, a need exists for reducing an average transit time (latency) of signals in flight. A further need exists for a system and method for allocating memory locations to reduce time in flight in memory storage systems.

SUMMARY OF THE INVENTION

A system and method for reducing latency in memory systems is provided. A copy way is established in a set of a set associative cache, which is physically closer to a requesting entity than other memory locations within a set. Likely to be accessed data in remote sections of the cache is copied to the copy way for subsequent access. In this way, subsequent accesses of the most likely data have their access time reduced due to the physical proximity of the data being close to the requesting entity.

Rearrangement of blocks within a set may also be managed by coupled local and global least recently used algorithms that rank blocks according to their last access.

Another method for reducing latency in memory systems, includes establishing at least one remote way and at least one local way in a set associative cache based on physical proximity to a requesting entity. Blocks in the cache are ranked based on most recently used through least recently used blocks by providing an overall ranking of all blocks and a local ranking of blocks in local ways. Upon access of a block by the requesting entity, the blocks are rearranged based on the overall ranking and the local ranking to reduce latency time in accessing the block.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 1 is a block diagram showing a set associative cache divided into two regions based on proximity to a requesting entity in accordance with the present invention;

FIG. 2 is a block diagram showing a set associative cache divided into three regions based on proximity to a requesting entity in accordance with the present invention;

FIGS. 4A–4C are block diagrams showing the generation of a copy way using an invalidated cache block in accordance with another embodiment of the present invention;

FIGS. 8A–8E are block diagrams for another method for advantageously organizing blocks stored in a set so that average latency of fetch requests is reduced in accordance with yet another embodiment of the present invention.

DETAILED DESCRIPTION OF PREFERRED EMBODIMENTS

Figure 3C:
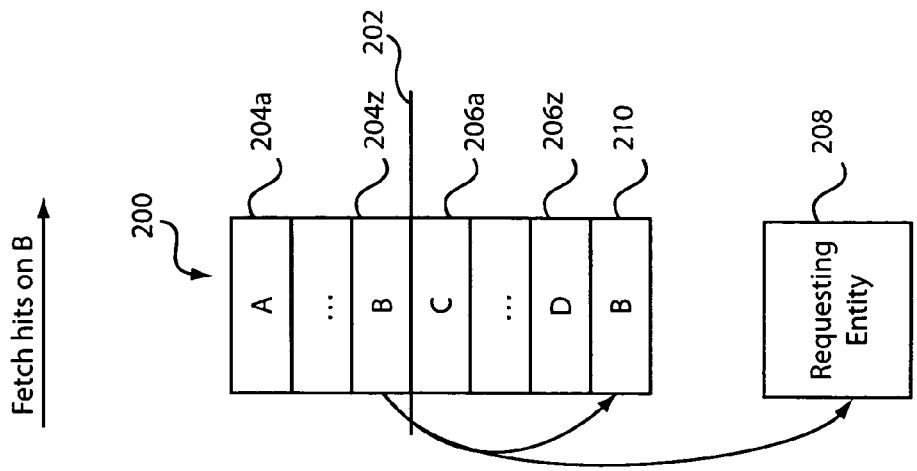
FIGS. 3A–3C are block diagrams showing the use of a copy way in accordance with one embodiment of the present invention.

The present invention provides systems and methods for allocating memory to reduce latency in memory storage system. In particularly useful embodiments, an average transit time (latency) is reduced for requested addresses in flight from a requesting entity to a subarray of a data cache and retrieved data in flight from the subarray of the data cache back to the requesting entity.

The present invention addresses communicational latency, indirectly, by improving the placement of data in set-associative caches. Better placement encourages more accesses to local regions of the cache and fewer to remote regions of the cache. The opportunity to improve placement of data in a set associative cache exists because a multiplicity of potential storage locations for data exist within each set of the cache, and these storage locations are distributed over great distances.

To achieve the reduction in average transit time, subarrays of a physically distributed data cache are divided into local and remote regions with shorter and longer access times, respectively. Placement methods migrate more frequently used data to local regions of the data cache and less frequently used data to remote regions of the data cache.

It should be understood that the placement methods, described herein, manage the placement of blocks within a set. A set associative cache includes a plurality of such sets, and that each block within the cache is uniquely identified by the combination of a set address (or index) and its assigned way. The way provides the architectural mechanism for placing a block in any one of "N" locations, within each set, where "N" defines the degree of associativity of the set associative cache. A "way" comprises a plurality of storage locations in the cache, one storage location per set. In the context of this disclosure that deals with arrangement of blocks within a set the term "way" will, instead, refer to the aforementioned one storage location, rather than the plurality of storage locations.

It should be understood that the elements shown in the FIGS. may be implemented in various forms of hardware, software or combinations thereof. Preferably, these elements are implemented in a combination of hardware and software on one or more appropriately programmed general-purpose digital computers having a processor and memory and input/output interfaces. Referring now to the drawings in which like numerals represent the same or similar elements and initially to FIG. 1, a set 200 of a set associate cache having a total of N potential ways (storage locations where blocks may be stored) is shown in accordance with one illustrative embodiment. Line 202 divides the set 200 into remote and local regions. Remote ways 204a–z are physically located in a remote region far away from a requesting entity 208, and local ways 206a–z are physically located in local region proximate to the requesting entity 208. The requesting entity 208 is included in the figure solely as a reference point to define schematically/visually local and remote regions. Blocks A–D are stored in local ways 206a–z and remote ways 204a–z.

Referring to FIG. 2, a set having local ways 201, intermediate ways 203, and remote ways 205 is illustratively shown. It is contemplated that the same placement policies may be applied to local and remote ways without impacting placement in the middle ways. In general, it is contemplated that a hierarchy of ways may be defined ranging from local to remote, and placement algorithms may be developed to manage the block placement among the hierarchy of ways.

Access time to retrieve a block (e.g., block A) from the remote ways 205 is greater than that to retrieve a block (e.g., block F) from the local ways 201, due to the time of flight sending an address to the remote ways 205 and retrieving data (e.g., block A) from the remote ways 205. Hence, average latency to retrieve blocks can be minimized by continuously rearranging the block's placement within set 200, such that local ways 201 are referenced with higher frequency than remote ways.

Figure 3B:
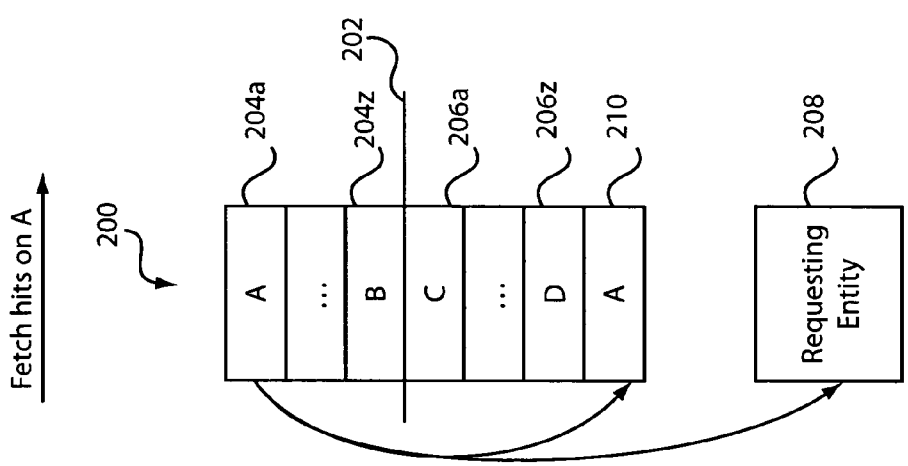
Figure 3A:
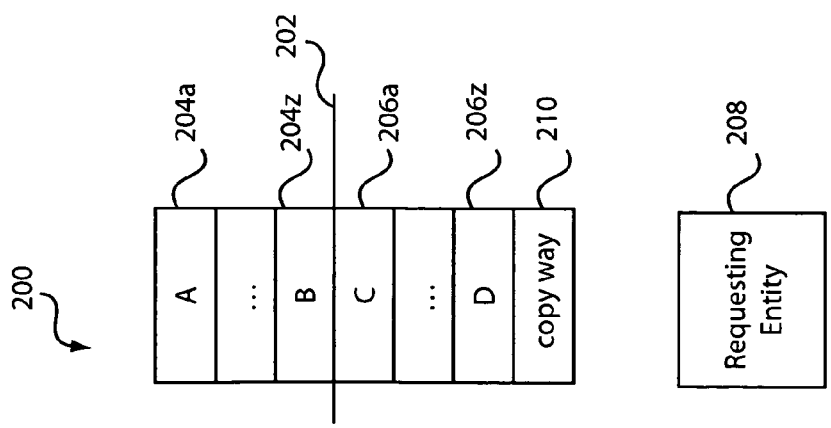

Referring to FIGS. 3A–3C, a copy way (block duplication) concept will now be described in accordance with one embodiment of the present invention. A copy way 210 is included in FIG. 3A. Copy way 210 is a special type of local way in which a block requested from a remote way can be duplicated, such that, in a subsequent access, the block can be retrieved from the copy way 210 sooner than from a remote way. In other words, copy way 210 holds a block that is also stored in a remote way. The copy block exists in duplicate, in both the copy way and the remote way.

A variety of requests made specifically to a given set within a set associative cache may, and in specific cases will, alter the placement of blocks A–D in copy ways, local ways, and remote ways. The migration of blocks A–D among the remote and local ways will be discussed hereinbelow. However, for the purposes of illustration, the initial placement of blocks A–D within a set of an N-way set associative cache 200 follows.

Referring to FIG. 3A, block A is initially stored in remote way 204a; block B is initially stored in remote way 204z; block C is initially stored in local way 206a; and block D is initially stored in local way 206z. Assume for this example, that having been earlier invalidated, the copy way 210 can be considered unoccupied.

Referring to FIGS. 2 and 3B, a fetch request is received from a requesting entity 208 and hits on remote way 204a, and, eventually, block A arrives at requesting entity 208. Since block A includes the most recently used data, it is most likely to be requested next and, hence, should reside in a preferential position within the set, e.g., a local way region 201 to minimize the latency of the request.

Instead of ousting other recently used blocks C and D, block A is stored in copy way 210, as depicted in FIG. 3B. The copy way 210 now holds block A, an exact copy of the block held in the remote way 204a. It is likely that subsequent requests will hit on block A, which can be accessed with minimal latency since it is held in a local way, the copy way 210.

Considering that block A exists in duplicate, the remote copy of block A could be invalidated at any time without loss of data. However, it can be advantageous to leave both copies alive even though this will create more traffic when block A is modified by a store instruction.

Referring to FIG. 3C, suppose a fetch request from the requesting entity 208 hits on remote way 204z, and eventually block B arrives at requesting entity 208. Since block B holds the most recently used data, it can now be stored in copy way 210 as depicted in FIG. 3C. Copy way 210 can be written without jeopardizing block A, since a copy of block A exists in remote way 204a. In this example, the most recently accessed block of the remote ways 204a–z is kept in the copy way 210. The block held in copy way 210 only changes when another of the remote ways 204a–z hits. A copy way minimizes average latency to all remote ways since it holds a copy of the most recently used block, of the remote ways, in the copy way.

In one embodiment, the copy way 210 is assigned a fixed location within the set, and the number of copy ways is fixed. Each of these fixed copy ways consumes memory, however, that could be used to form an additional way to reduce the overall miss rate of the cache. In response to this, it is further contemplated that one or more copy ways may be generated dynamically, temporarily reducing the number of local ways within the set. In other words, copy ways may be created from local ways as the need arises. Depending on temporal conditions of the set 200, any local way 206a–z may be designated by cache control logic as a copy way 210, and conversely any copy way 210 may be designated by the cache control logic as a local way 206a–z.

Dynamic Generation and Destruction of a Copy Way

A set having the capability of dynamically generating a copy way for the purpose of reducing average latency to its blocks comprises at least one remote way and at least one local way. A local way may serve temporarily as a copy way. Significantly aged blocks stored in a local way 206a–z may be periodically invalidated freeing the local way 206a–z to be reassigned as a copy way, unless another higher priority request to the set, such as the storage triggered by a miss, consumes the invalidated local way to store a miss replacement block.

In the prior embodiment, a copy way may be associated with a fixed location in a set. This location may be used exclusively for the purpose of the copy way and would therefore be idle when copy blocks are invalidated. To improve space efficiency, this embodiment contemplates that a copy way can be a logical concept instead of a physical concept. For example, any unused slots in the local area can be used as a copy way. Such unused slots can result from a plurality of scenarios, for example:

(1) In a multiprocessor environment, a block may need to be invalidated in a private cache of one processor because another competing processor requires exclusive rights to write the same block that the first processor also holds a copy of. This is done to avoid violating the coherency of the memory shared by the processors. Most symmetric multiprocessors (SMPs) use a write-invalidate cache coherency protocol to manage a write to a block when other copies of the block exist in a plurality of private caches. Under this protocol, to assure coherency of the shared memory space, these other copies of the block are invalidated when a single processor needs to write the block stored in its private cache. As a result, many local ways may store invalidated blocks.

(2) A block may be invalidated in an aging cache, such as a DRAM-based cache, where stored data, in some instances, can be permitted to leak away with time, or an energy-efficient cache design, which proactively turns off inactive cache blocks for leakage savings.

Invalidated slots (local ways) can be used to store the remote blocks recently accessed thus fulfilling the functionality of a copy way.

Referring to FIGS. 4A–4C, the generation of a copy way using an invalidated cache block is illustratively shown for one particularly useful scenario. In FIG. 4A, when a competing processor 213 requests exclusive ownership of block A, the local processor invalidates block A and thus an empty slot is generated, as shown in FIG. 4B. At this time, when a remote block D is accessed, a copy of the block will be stored in the empty slot (local way 206a), thus the empty slot becomes the copy way, as depicted in FIG. 4C.

To insure coherency between a block stored in a remote way and its copy stored in a local way, both blocks could be updated under a write, or one block could be invalidated. In either case, the directory control logic may detect the presence of a copy block easily by detecting two hits, instead of one. It is also contemplated that an additional control bit 211, similar to one of the MESI bits, known to those skilled in the art, could be added to a directory entry to flag a block and its copy.

Data Migration and Placement Algorithms

By ranking blocks stored in local ways, in addition to ranking blocks stored in all ways (both local and remote), new placement algorithms may be formulated that cause MRU (most recently used) blocks to be stored in local ways and LRU blocks (least recently used) to migrate to remote ways. These algorithms need two rankings per set, a "local LRU" and a "global LRU", where the "global LRU" is the equivalent of the present LRU known in the art, and the "local LRU" is a subset of the global LRU that ranks only the blocks stored in local ways.

In the prior art, access-based ranking of blocks determines which block to evict in handling a miss. In the present invention, the role of ranking encompasses the rearrangement of blocks within a set for the purpose of reducing average latency to retrieve the blocks. As such, subsequent figures will include a notation to designate the ranking of each block. In these figures, each block will receive a rank from "1" to "N", respectively, where "N" equals the number of ways in a set associative memory. A rank of "1" is given to the most recently used (MRU) block. A rank of "N" is given to the LRU block. Each time, for example, a fetch request hits on a particular set, the block that hits becomes the MRU block, and its rank within the set is, therefore, assigned to "1."

Figure 5B:
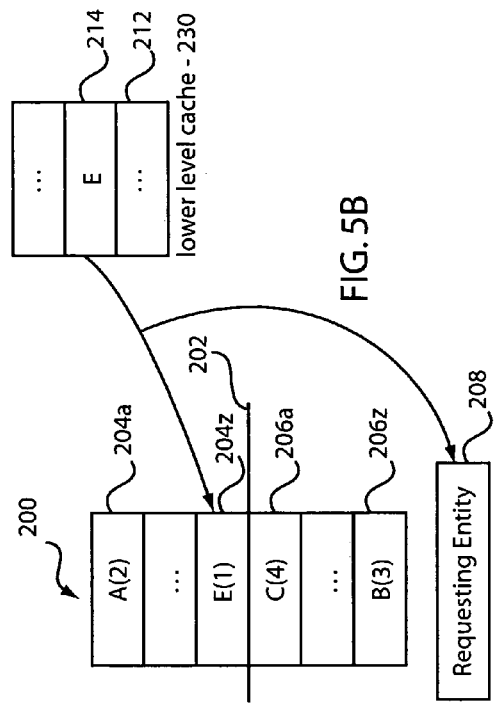
FIGS. 5A–5D are block diagrams showing the placement of blocks within a cache with local and global least recent updates in accordance with another embodiment of the present invention.
Figure 5D:
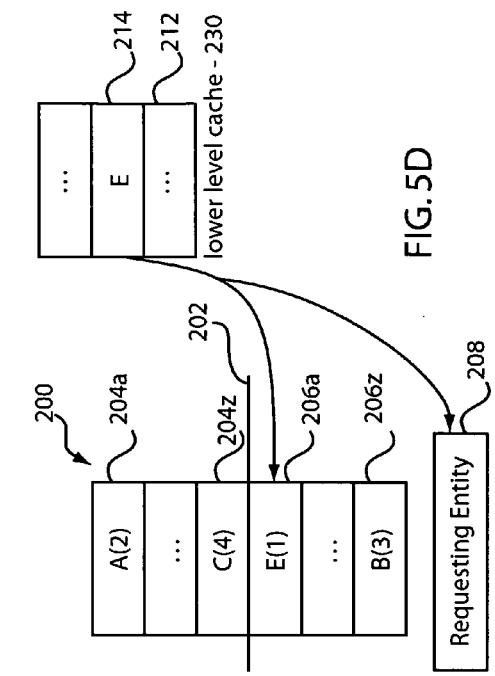
Figure 5A:
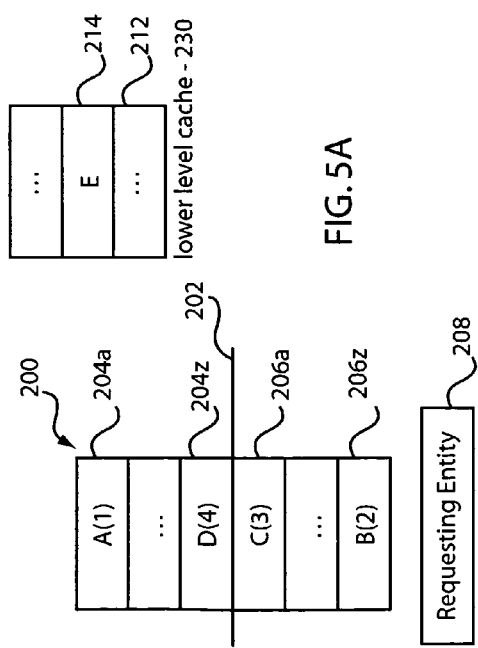

Referring to FIGS. 5A–5D, to understand how the placement of blocks within a cache can be improved with local and global LRUs, two examples describing the handling of a miss are offered as examples. The first example illustrates pitfalls of one placement approach and is illustrated in FIGS. 5A and 5B. The second example describes how to overcome the pitfalls of the first example by exploiting both local and global LRUs to realize a preferred placement, and follows the sequence of FIGS. 5A, 5C and 5D.

FIG. 5A depicts the initial placement for each of the two examples prior to when the replacement block replaces the LRU block. Remote ways 204a–z are located in the remote region far away from the requesting entity 208, and local ways 206a–z are located in a local region proximate to the requesting entity 208. A request for block A was the prior reference. Block A holds the MRU data and, accordingly, location 204a is denoted with "1." Block D holds the LRU block, and block C holds the LRU block of those stored in the local ways.

The requesting entity 208 now requests block E, which does not reside within the set 200. The memory management unit will search both the local ways and the remote ways, and the memory management unit will detect a cache miss that indicates E is not within the set 200. A request for block E will be sent to a lower level cache memory 230 (e.g. larger cache or main memory). When block E is retrieved, it is forwarded to the requesting entity 208. Since block E is now the MRU data, it is very likely to be accessed again and, therefore, should be placed within the set 200. To make space for block E, one of the blocks currently residing within the set needs to be evicted. The LRU algorithm is the most widely used algorithm to determine which data to evict. The algorithm tracks access-ordering of all the blocks in a set and identifies the LRU block for eviction.

FIG. 5B depicts the placement of blocks after the global LRU block D(4) is replaced by the replacement block E. Block E now holds the MRU data, denoted by a "1," and resides in remote way 204z. Since block E is very likely to be accessed again, block E should have been placed in a local way, which has a shorter latency for future references, instead of the remote way.

Figure 5C:
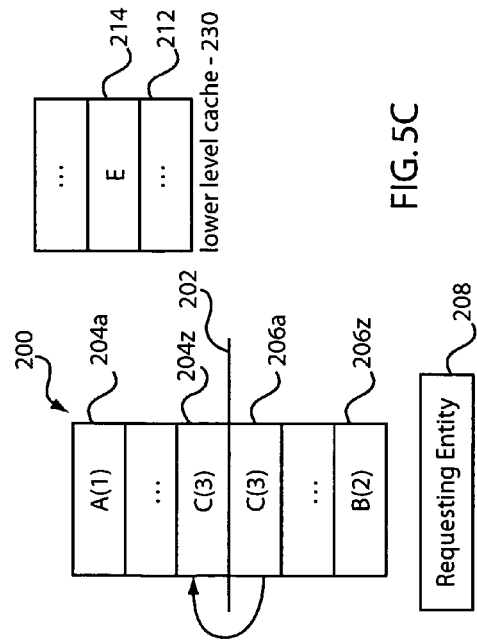

The present invention provides a two-step-location-based-LRU algorithm, as illustrated through the sequence of FIGS. 5A, 5C and 5D, for evicting the global LRU block from the set 200 and placing the MRU block E, henceforth referred to as the miss replacement block, in a local way. It is assumed that the initial placement of blocks within a set is that of FIG. 5A. An eviction of a block due to a miss causes the two-step rearrangement.

In FIG. 5C, the local LRU, block C(3), replaces the global LRU, block D(4), in remote way 204z. In other words, the cache evicts block D(4), the LRU Block. Next, in FIG. 5D, the miss replacement block E replaces the local LRU, block C, in local way 206a. Block C has been moved to remote way 204z. With further logical clarification of this algorithm, the miss replacement block, the MRU block, can be stored in a local way in all cases, so the latency of future references to the block is reduced.

Figure 6:
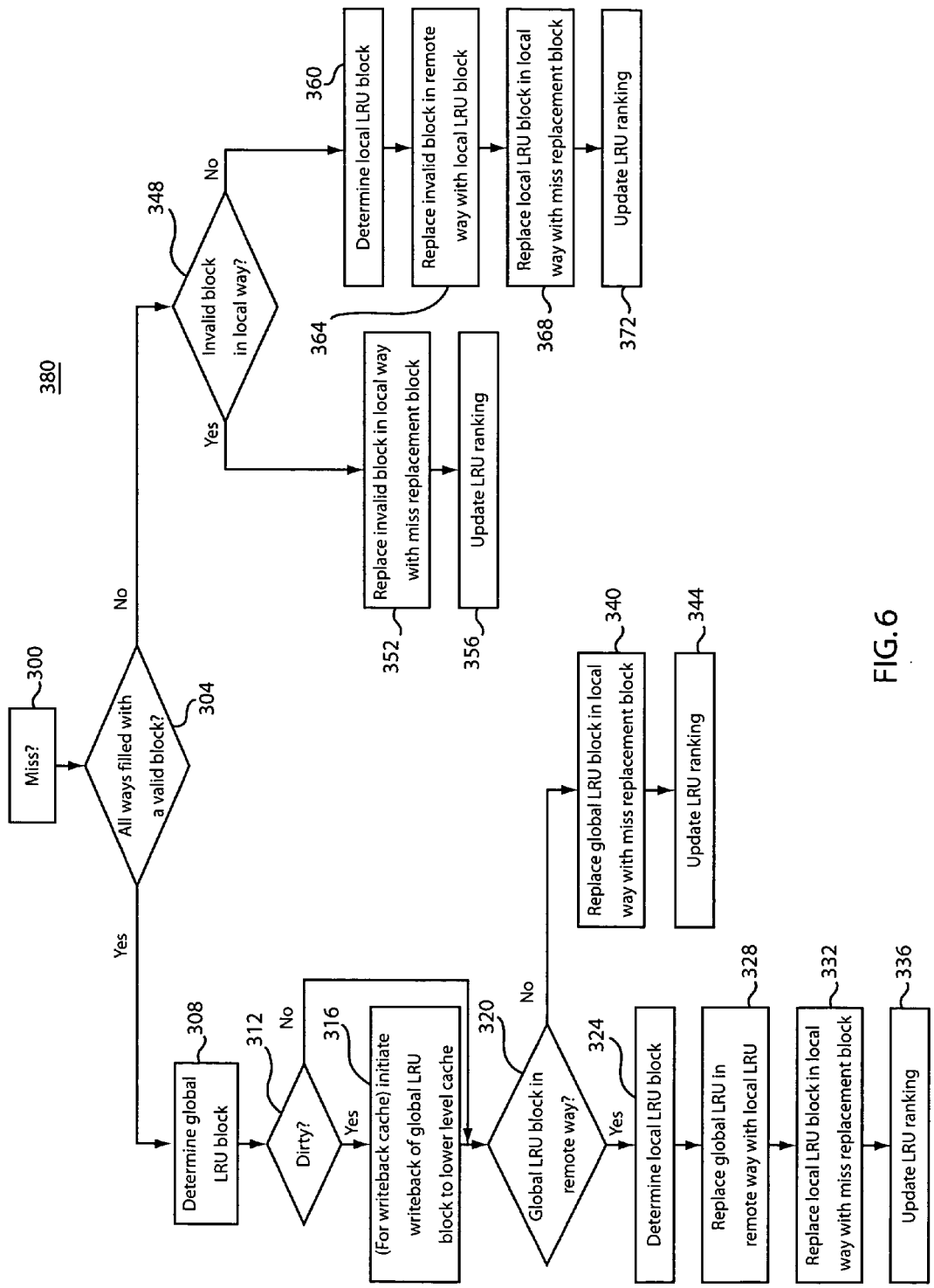
FIG. 6 is a block/flow diagram for handling the placement of a miss replacement block in a local way in accordance with one embodiment of the present invention.

Referring to FIG. 6, a flow chart 380 is shown for handling the placement of a miss replacement block in a local way in accordance with one embodiment of the present invention. Upon a miss being detected in step 300), the logic of the flow chart is invoked to guide the placement of the miss replacement block to a local way. Four potential paths through the flow chart exist:

Path 1: All ways are filled with valid blocks, and the global LRU block is stored in a remote way;

Path 2: All ways are filled with valid blocks, and the global LRU block is stored in a local way;

Path 3: At least one way holds an invalidated block, and the invalidated block is stored in a local way; and Path 4: At least one way holds an invalidated block, and the invalidated block is stored in a remote way.

Path 1 describes the actions needed of the miss handling logic to achieve the placement of the miss replacement block in a local way when, initially, all ways are filled with valid blocks, and the global LRU block is stored in a remote way. FIGS. 5A, 5C, and 5D illustrate the block movement in accordance with path 1.

After a miss is detected in step 300, all ways are searched to determine whether or not they hold a valid block in step 304. If all the ways hold valid blocks, then one block, e.g., the global LRU block, is evicted to make room for the miss replacement block. First, the global LRU may be determined in step 308. If the global LRU block is dirty (i.e., has been written), and the cache uses write-back to update lower level caches, a yes for step 312 is registered, and the process to write the updated global LRU block back to the lower level cache is initiated in step 316. Otherwise, the flow proceeds to step 320 where the global LRU block is evaluated to see whether the global LRU block is stored in a remote way.

If a remote way holds the global LRU block, then the local LRU block is determined in step 324. The local LRU block then replaces the global LRU block stored in the remote way in step 328, and the miss replacement block fills the local way vacated by the transfer of the local LRU block to the remote way in step 332. The LRU ranking of all blocks within the set is then updated in step 336. These steps may occur over many machine cycles, and the steps may be reordered.

The steps of FIG. 6 are to achieve a final block placement that stores the miss replacement block, the MRU block, in a local way so that the latency to retrieve the miss replacement block is minimized.

Path 2 describes the actions needed for the miss handling logic to achieve the placement of the miss replacement block in a local way when, initially, all ways are filled with valid blocks, and the global LRU block is stored in a local way. Path 2 deviates from Path 1 at step 320. If the global LRU block is stored in a local way, the global LRU block may be directly replaced by the miss replacement block in step 340. The LRU ranking of all blocks within the set is then updated in step 344. These steps may occur over many machine cycles, and may be reordered.

Path 3 describes the actions needed for the miss handling logic to achieve the placement of the miss replacement block in a local way when, initially, at least one way holds an invalidated block, and the invalidated block is stored in a local way. After a miss is detected in step 300, all ways are searched to determine whether or not they hold a valid block in step 304. If one way holds an invalid block, then the miss replacement block can replace this block without having to evict another block. If the invalid block is stored in a local way in step 348, the miss replacement block may replace the invalid block directly in step 352. The miss replacement block, therefore, will reside in a local way. The LRU ranking of all blocks within the set is updated in step 356. These steps may occur over many machine cycles, and may be reordered.

Path 4 describes the actions needed for the miss handling logic to achieve the placement of the miss replacement block in a local way when, initially, at least one way holds an invalidated block, and the invalidated block is stored in a remote way. After a miss is detected in step 300, all ways are searched to determine whether or not they hold a valid block in step 304. If one way holds an invalid block, then the miss replacement block can replace this block without having to evict another block. If the invalid block is not stored in a local way in step 348, then the local LRU block needs to be determined in step 360. The local LRU block then replaces the invalid block stored in the remote way in step 364, and the miss replacement block fills the local way vacated by the transfer of the local LRU block to the remote way in step 368. The miss replacement block, therefore, will reside in a local way. The LRU ranking of all blocks within the set is then updated in step 372. These steps may occur over many machine cycles, and may be reordered.

In processing a miss with coupled global and local LRUs, the flow chart 380 ensures that the MRU block, that has been referred to as the miss replacement block, is stored in one of the local ways and that the LRU blocks migrate to remote ways. It is also contemplated that the global and local LRUs can be used to advantageously arrange block placement under a hit, as will be discussed with respect to FIGS. 7A–7E and FIGS. 8A–8E.

Figure 7B:
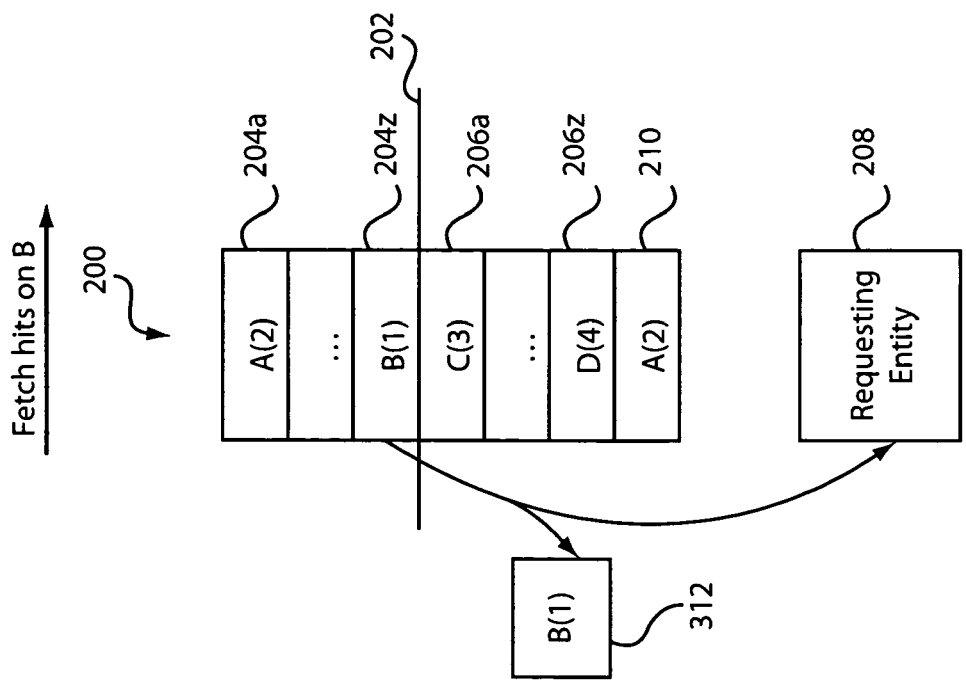
FIGS. 7A–7E are block diagrams for advantageously organizing blocks stored in a set so that average latency of fetch requests is reduced in accordance with another embodiment of the present invention.
Figure 7A:
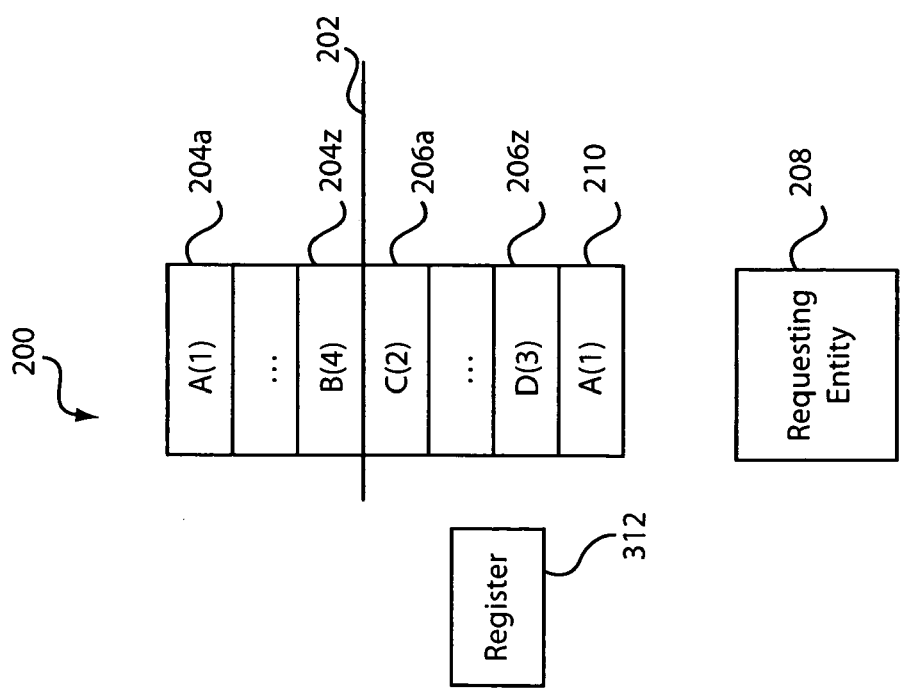

Referring to FIGS. 7A–7E, another placement algorithm that combines the copy way with the coupled local and global LRUs taught in prior embodiments is illustratively shown for advantageously organizing blocks stored in a set so that average latency of fetch requests may be reduced. For this embodiment, the initial placement of blocks A–D within a set of the cache is depicted in FIG. 7A and described hereafter. Block A is initially stored in both remote way 204a and in copy way 210; block B is initially stored in remote way 204z; block C is initially stored in local way 206a; and block D is initially stored in local way 206z.

FIG. 7A includes a register 312, which holds the block in transit while one or more blocks A–D within the set is being relocated. Assume that the prior reference had been a request for block A and that block A had been stored exclusively in remote way 204a. Operating under the prior memory management scheme, block A had, therefore, been copied to the copy way 210. Given that block B now hits, it would be advantageous to rearrange placement of blocks A–D within the set, instead of overwriting block A in copy way 210, because block A previously had held the most recently used data, and therefore, will likely be referenced again. The following steps may be taken by a memory management unit to maintain block A in one of the local ways 206a–z for low latency reference, but move block A outside the copy way 210.

Figure 7D:
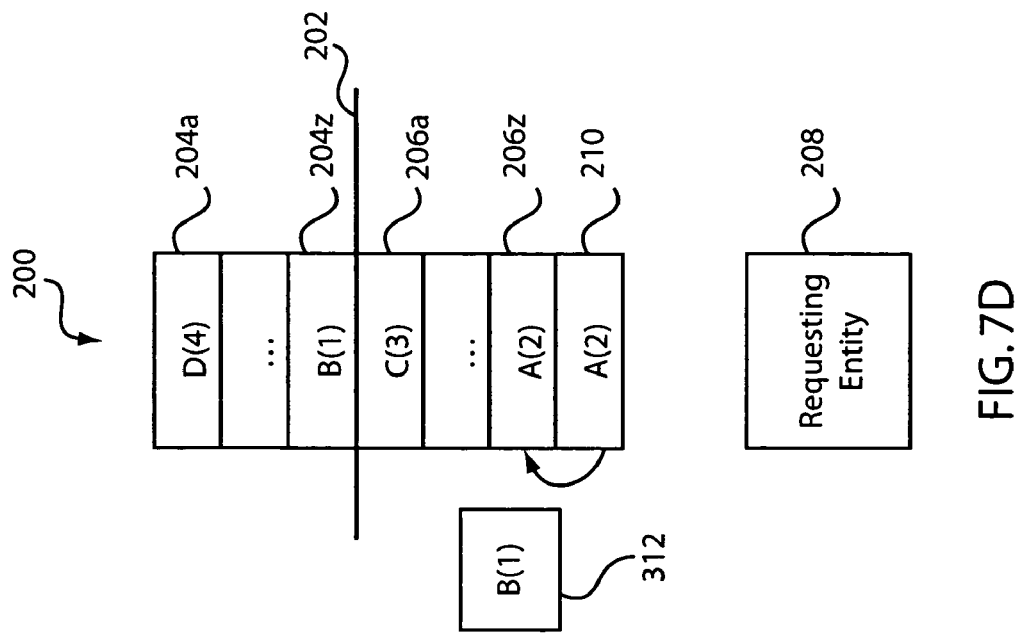
Figure 7C:
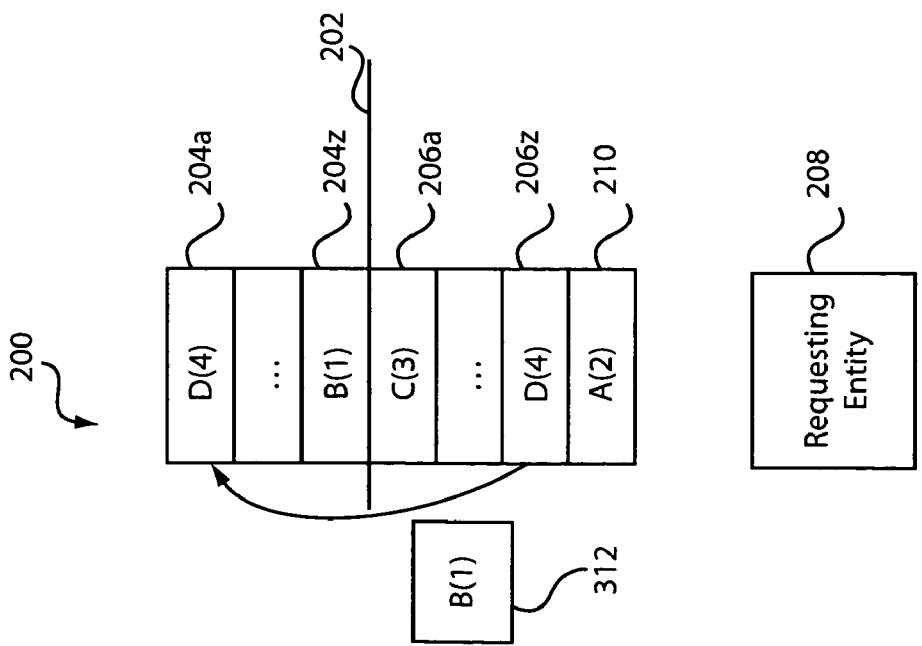
Figure 7E:
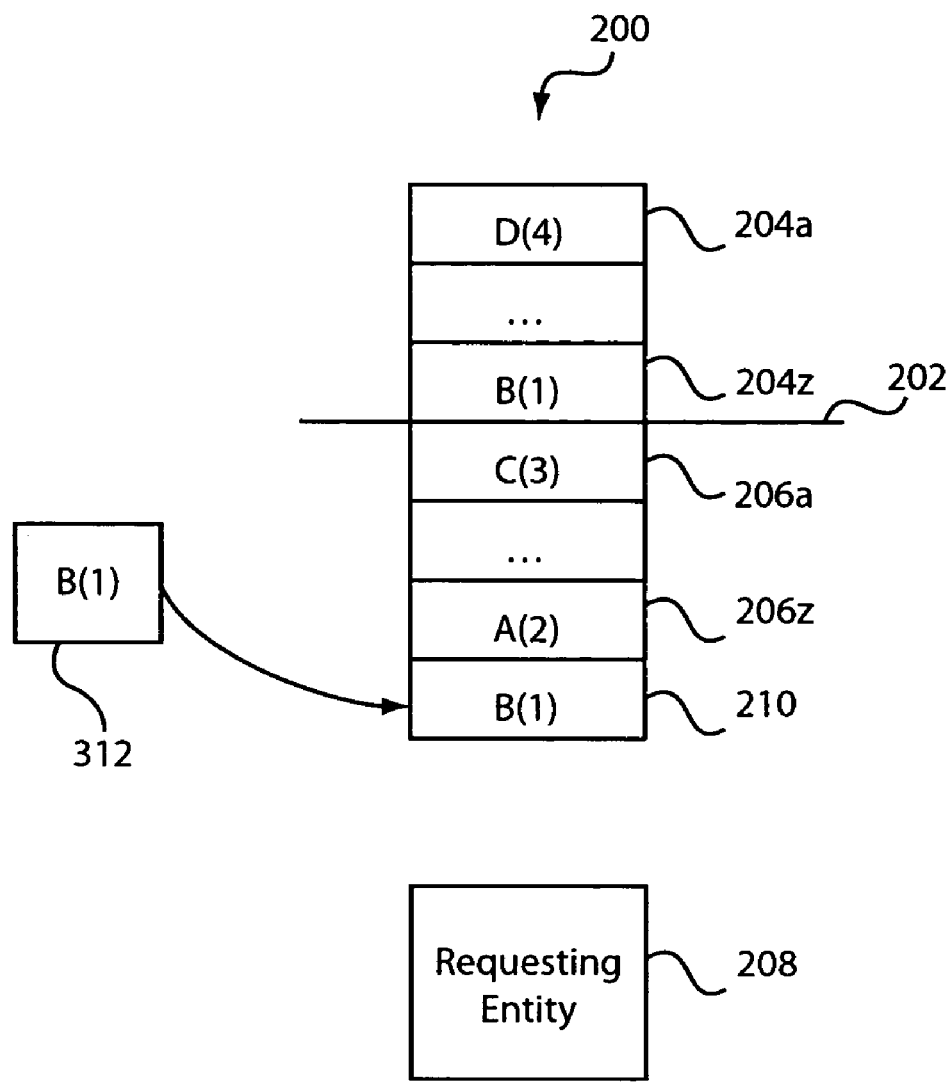

The steps may include:

1) As depicted in FIG. 7B, block B may be retrieved from remote way 204z for the requesting entity 208, in response to the request for data, and concurrently stored in register 312;

2) The local ways may be searched for a candidate to move to a remote way by applying the local LRU algorithm. The local LRU, in this case, identifies block D;

3) As depicted in FIG. 7C, block D may be copied into remote way 204a overwriting the old copy of block A;

4) As depicted in FIG. 7D, block A may be retrieved from copy way 210 and written into local way 206z; and 5) As depicted in FIG. 7E, block B may be retrieved from register 312 and written into copy way 210.

The rearrangement of blocks within the set would move the MRU block to copy way 210, move the next most recently used block to local way 206z, and migrate the LRU block to remote way 204a.

Register 312 temporarily holds a block, and therefore its contents, presently block B (in FIG. 7E) may be and most likely will be altered during subsequent processes that rearrange blocks within the plurality of sets of the N-way set associative cache. It does not serve as another way.

Figure 8B:
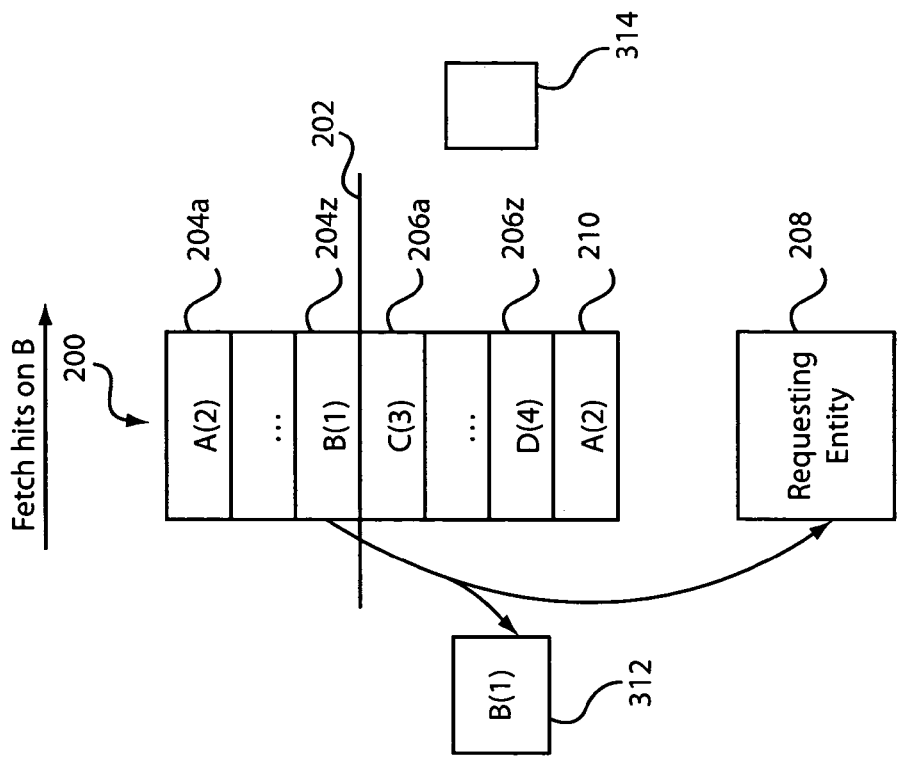
Figure 8A:
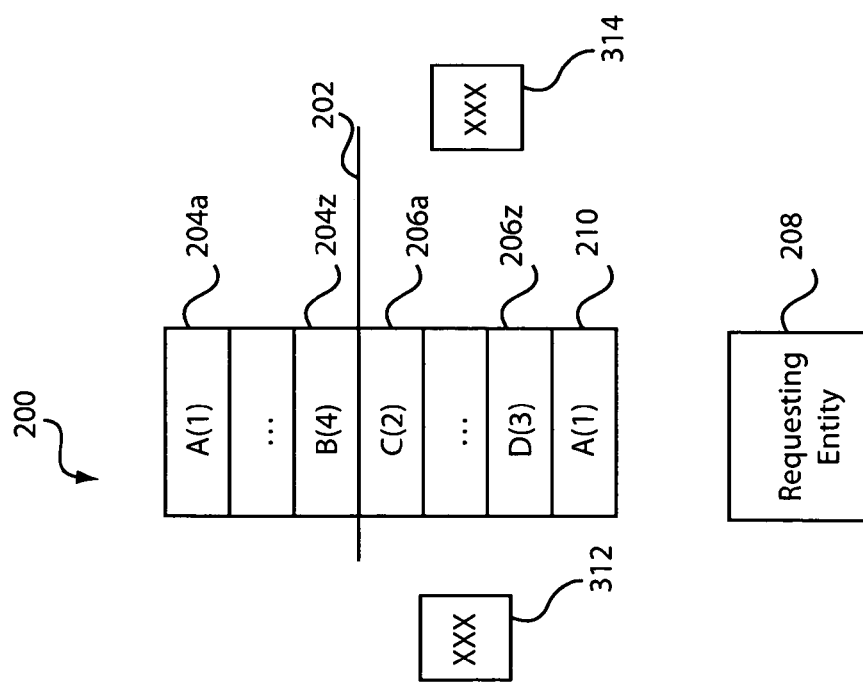

Referring to FIGS. 8A–8E, another placement algorithm that combines the copy way with the coupled local and global LRUs taught in prior embodiments is illustratively shown for rearranging blocks A–D within the set, which involves fewer steps than the sequence previously described with respect to FIGS. 7A–7E. The initial placement of blocks within FIG. 8A is identical to that of FIG. 7A, and the final rearrangement of blocks within FIG. 7D is nearly the same as that within FIG. 7E except the physical location of the local way (which is transformed into a copy way) holding block B changes.

Register 314 has been added to hold a second block in addition to a block held by register 312 while blocks are being relocated. Assume that the prior reference had been a request for block A and that block A had been stored exclusively in remote way 204a. Given that block B now hits, it would be advantageous to rearrange placement of blocks A–D within the set, so a copy way stores block B. The following steps may be taken by a memory management unit to maintain block A in one of the local ways 206a–z for low latency reference but to move block A outside the copy way 210.

Figure 8D:
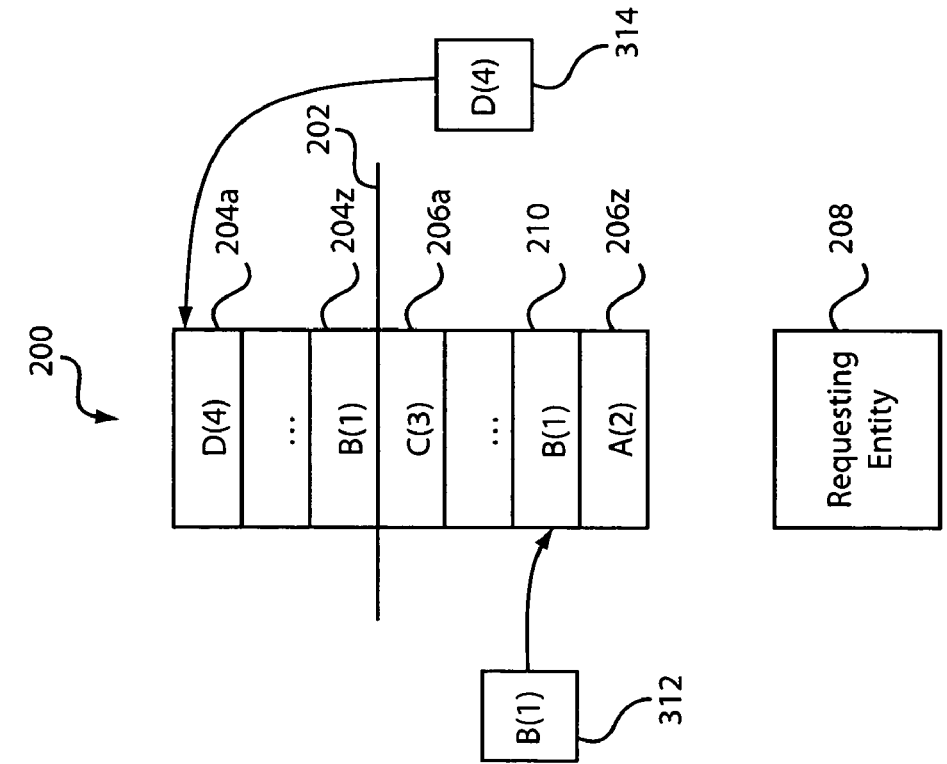
Figure 8C:
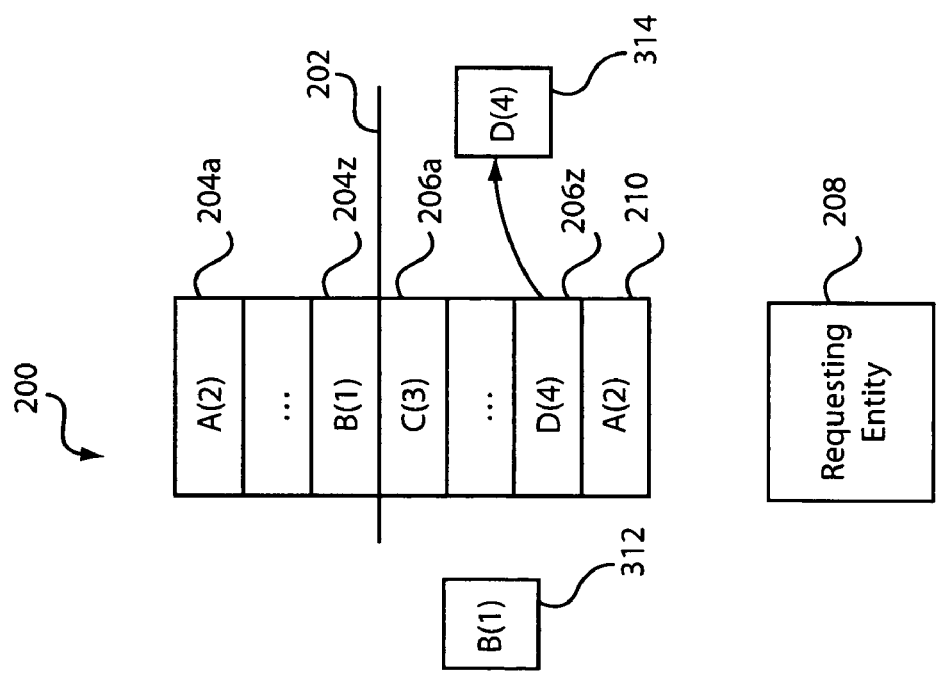

The steps may include:

1) As depicted in FIG. 8B, block B may be retrieved from remote way 204z for the requesting entity 208, in response to the request for data, and concurrently stored in register 312;

2) The local ways may be searched for a candidate to move to a remote way by applying the local LRU algorithm. The local LRU, in this case, identifies block D;

3) As depicted in FIG. 8C, block D may be copied into register 314; and

4) As depicted in FIG. 8D, block B and block D may be retrieved from register 312 and 314, respectively, and then written into copy way 210 and remote way 204a, respectively.

The final rearrangement of blocks within the set 200, as depicted in FIG. 8D, moves the MRU block to copy way 210 (altering the physical location of the copy way 210), moves the next most recently used block to local way 206z (altering the physical location of the local way 206z), and migrates the LRU block to remote way 204a all in 3 steps rather than 4 as described with respect to FIGS. 7A–7E.

FIG. 8E depicts an alternative step to that of FIG. 8D for the aging the block stored in the copy way, which is another approach to managing placement. FIG. 8E departs from the last step of memory management scheme described with respect to FIGS. 8A–8D.

As depicted in FIG. 8E, block B and block D may be retrieved from register 312 and 314, respectively, and then written into local way 206z and remote way 204z, respectively, such that block D replaced a copy of B in the remote way. This is an alternative to the step 4 in FIG. 8D.

In this case, the copy block stored in the copy way ages. Eventually, the aged copy block A may become the LRU block. Then, in processing the next miss to the set, the status of the copy way holding the aged copy block could be changed to that of a local way allowing the aged copy block in the newly defined local way to be overwritten by the new miss block. A second copy of the copy block A exists in the remote way so an eviction of the copy block is unnecessary.

Having described preferred embodiments of a system and method for location-based placement algorithms for set associative cache memory (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for reducing latency in memory systems, comprising the steps of:
    establishing a copy way within a set associative cache wherein the copy way is physically closer, within the set associative cache, to a requesting entity than other memory positions in the same set associative cache, the set associative cache being disposed at a single location; and
    copying likely to be accessed data to the copy way for subsequent access, wherein the set associative cache is divided into at least two physical regions based on proximity to the requesting entity and the at least two regions include a local way and a remote way, and the copy way is located in the local way.

2. The method as recited in claim 1, wherein the copy way is written to in response to a data request from the requesting entity.

3. The method as recited in claim 1, wherein a last accessed block is written to the copy way in response to a data request from the requesting entity.

4. The method as recited in claim 1, wherein the copy way includes a redundant copy of a last accessed block.

5. The method as recited in claim 1, further comprising the step of ranking blocks in the memory system by assigning an order for most recently used blocks through a least recently used block.

6. A program storage device readable by machine, tangibly embodying a program of instructions executable by the machine to perform method steps for method for reducing latency in memory systems, as recited in claim 1.

7. A method for reducing latency in memory systems, comprising the steps of:
    establishing a copy way in a set associative cache, which is physically closer to a requesting entity than other memory positions in a same associative cache, the set associative cache being disposed at a single physical location;
    in response to a data access from the requesting entity:
    moving a most recently used block to the copy way;
    moving a next most recently used block to a local way; and
    migrating a least recently used block to a remote way, wherein the local way is closer to the requesting entity than the remote way and the copy way is located in the local way.

8. The method as recited in claim 7, further comprising at least one register wherein the method further comprising employing the at least one register to transfer any block.

9. The method as recited in claim 7, further comprising the step of ranking blocks in the memory system by assigning an order for most recently used blocks through a least recently used block.

10. A program storage device readable by machine, tangibly embodying a program of instructions executable by the machine to perform method steps for method for reducing latency in memory systems, as recited in claim 7.

11. A system for providing reduced latency for memory access, comprising:
    at least one set associative cache, disposed at a single location, for storing a plurality of blocks, the blocks being divided into at least two regions based on proximity to a requesting entity; and at least one copy way located in a region closest to the requesting entity, the at least one copy way for storing a most recently used block to provide the block for subsequent access, wherein the two regions include a local way and a remote way, and the at least one copy way is located in the local way.

12. The system as recited in claim 11, wherein the at least one copy way is written to in response to a data request from the requesting entity.

13. The system as recited in claim 11, wherein a last accessed block is written to the at least one copy way in response to a data request from the requesting entity.

14. The system as recited in claim 11, wherein the at least one copy way includes a redundant copy of a last accessed block.

15. The system as recited in claim 11, further comprising rankings of blocks, which includes assigning an order for most recently used blocks through a least recently used block.

16. The system as recited in claim 11, further comprising flags for associating a block stored in the at least one copy way with a redundant copy in a remote way.

17. A method for reducing latency in memory systems, comprising the steps of:

establishing at least one remote way and at least one local way in a set associative cache based on physical proximity to a requesting entity where the at least one local way is physically closer to a requesting entity than the at least one remote way, wherein the set associative cache is disposed at a single physical location;

ranking blocks in the cache based on most recently used through least recently used blocks by providing an overall ranking of all blocks and a local ranking of blocks in the at least one local ways; and upon access of a block by the requesting entity, rearranging the blocks based on the overall ranking and the local ranking to reduce latency time in accessing the block.

18. The method as recited in claim 17, wherein the step of rearranging includes deleting a block to provide a location in the at least one local way.

19. The method as recited in claim 17, wherein the step of rearranging includes migrating a block to a remote way to provide a location in the at least one local way.

20. The method as recited in claim 17, further comprising the step of updating the rankings after the rearranging step.

21. A program storage device readable by machine, tangibly embodying a program of instructions executable by the machine to perform method steps for method for reducing latency in memory systems, as recited in claim 17.

* * * * *

UNITED STATES PATENT AND TRADEMARK OFFICE
CERTIFICATE OF CORRECTION

PATENT NO. : 7,093,075 B2
APPLICATION NO. : 10/704452
DATED : August 15, 2006
INVENTOR(S) : William Robert Reohr et al.

It is certified that error appears in the above-identified patent and that said Letters Patent is hereby corrected as shown below:

Column 10, claim 11, line 64-65, between "single" and "location", insert --physical--

Signed and Sealed this

Sixteenth Day of January, 2007

JON W. DUDAS
*Director of the United States Patent and Trademark Office*